(12) United States Patent
Fox et al.

(10) Patent No.: US 11,760,872 B2
(45) Date of Patent: Sep. 19, 2023

(54) FILAMENT COMPOSITIONS FOR FUSED FILAMENT FABRICATION AND METHODS OF USE THEREOF

(71) Applicant: E I DU PONT DE NEMOURS AND COMPANY, Wilmington, DE (US)

(72) Inventors: Peter Anthony Fox, Wilmington, DE (US); Steven R. Oriani, Landenberg, DE (US)

(73) Assignee: DuPont Polymers, Inc., Wilmington, DE (US)

( * ) Notice: Subject to any disclaimer, the term of this patent is extended or adjusted under 35 U.S.C. 154(b) by 1093 days.

(21) Appl. No.: 16/340,742

(22) PCT Filed: Oct. 12, 2017

(86) PCT No.: PCT/US2017/056260
§ 371 (c)(1),
(2) Date: Apr. 10, 2019

(87) PCT Pub. No.: WO2018/075320
PCT Pub. Date: Apr. 26, 2018

(65) Prior Publication Data
US 2021/0301122 A1  Sep. 30, 2021

Related U.S. Application Data

(60) Provisional application No. 62/411,042, filed on Oct. 21, 2016.

(51) Int. Cl.
| | | |
|---|---|---|
| C08L 67/00 | (2006.01) | |
| B33Y 70/00 | (2020.01) | |
| B29B 11/10 | (2006.01) | |
| C08L 77/06 | (2006.01) | |
| C08L 77/12 | (2006.01) | |
| C08G 63/44 | (2006.01) | |
| B33Y 10/00 | (2015.01) | |
| B29C 64/118 | (2017.01) | |
| B29K 77/00 | (2006.01) | |
| B29K 105/00 | (2006.01) | |

(52) U.S. Cl.
CPC ............. *C08L 67/00* (2013.01); *B29B 11/10* (2013.01); *B33Y 70/00* (2014.12); *C08G 63/44* (2013.01); *C08L 77/06* (2013.01); *C08L 77/12* (2013.01); *B29C 64/118* (2017.08); *B29K 2077/00* (2013.01); *B29K 2105/0005* (2013.01); *B33Y 10/00* (2014.12); *C08L 2203/12* (2013.01); *C08L 2203/30* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 7,144,938 B1 * | 12/2006 | Feinberg | ............. | C08L 23/0876 524/514 |
| 2008/0125551 A1 * | 5/2008 | Vollenberg | ............ | C08L 67/025 525/439 |
| 2016/0068678 A1 | 3/2016 | Luo et al. | | |
| 2016/0122541 A1 | 5/2016 | Jaker | | |

FOREIGN PATENT DOCUMENTS

| | | | |
|---|---|---|---|
| JP | 2007-051237 A | | 3/2007 |
| JP | 2016-169456 A | | 9/2016 |
| WO | 2015/188307 A1 | | 12/2015 |
| WO | WO 2016/004985 | * | 1/2016 |

OTHER PUBLICATIONS

International Search Report and Written Opinion in International Application No. PCT/US2017/056260, dated Jan. 12, 2018.

* cited by examiner

*Primary Examiner* — Robert T Butcher
(74) *Attorney, Agent, or Firm* — Dority & Manning, P.A.

(57) ABSTRACT

The disclosure generally relates to filaments and in particular, filaments for use in fused filament fabrication to prepare 3D printed articles. The filaments comprising a polymer composition, said polymer composition comprising: a) about 5 wt. % to about 60 wt. % of a thermoplastic polymer A having a melting peak temperature greater than 40° C.; b) about 95 wt. % to about 40 wt. % of a thermoplastic polymer B having a melting peak temperature greater than 20° C.; c) optionally from about 0.1 to 3 wt. % of a viscosity modifier; wherein: the melting peak temperature of thermoplastic polymer A is at least 20° C. greater than the melting peak temperature of thermoplastic polymer B; thermoplastic polymer A is dispersed in thermoplastic polymer B; and the polymer composition has a melt index of at least 0.1 g/10 minutes using a 10 kg weight measured according to ASTM D1238-13 at a temperature which is less than the melting peak temperature of thermoplastic polymer A and which is greater than the melting peak temperature of thermoplastic polymer B.

7 Claims, 1 Drawing Sheet

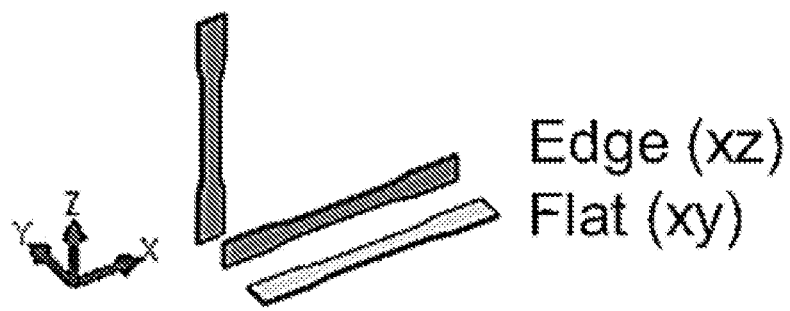

FILAMENT COMPOSITIONS FOR FUSED FILAMENT FABRICATION AND METHODS OF USE THEREOF

OVERVIEW

Disclosed herein are polymer compositions of use in preparing filaments, the use of such filaments in fused fabrication processes, and articles prepared by such processes.

Fused filament fabrication, also known as additive manufacturing or 3-dimensional printing (3D printing), is a process by which successive layers of a composition are deposited and fused to produce an article having a defined shape. By "fused" is meant that the successive layers adhere to one another, i.e., the fused article has a useful level of mechanical strength.

Fused filament fabrication (FFF) is a specific type of fused fabrication process in which the material enters the 3D printing device controlling the layer-by-layer deposition as a filament, fiber, or strand. The filament may have any cross sectional geometry or size, provided it enters the deposition device in a substantially continuous form. Fused filament fabrication simplifies material handling and compaction of material to be deposited compared to using pellets or powders.

Thermoplastics to be used in filaments for FFF face a number of conflicting requirements. They must flow easily during deposition in order to form the article and adhere to the layer previously deposited, but substantially cease flowing thereafter to prevent sagging and distortion of the printed article. Thermoplastics with high melting peak temperatures like polyamides, polyoxymethylene, or polyesters have desirable properties for finished articles, but their crystallization rates upon cooling adversely affects inter-layer adhesion and induces shrinkage or warpage that may distort the article as it is printed. Lower crystallinity polymers like ethylene co-polymers, thermoplastic polyurethanes, and co-polyesters may be readily processed by FFF, but the articles from these polymers lack stiffness. Adding conventional inorganic fillers such as talc, silica, $TiO_2$, or $CaCO_3$ to increase stiffness of such polymers increases the density of the filament and the printed article. The greater weight of each deposited layer then places more stress on the article as it is printed, potentially causing distortion. Furthermore, at high volume fractions, these fillers can produce articles that are brittle or the filaments may cause abrasive wear to the printing equipment.

Printing techniques such as rafts and brims have been used in an attempt to overcome warpage issues with limited success. Post-printing machining is not considered a viable option in many cases. Warpage induced delamination from the print bed can result in complete part failure as the printing process relies on sufficient adhesion to the print bed to maintain layer to layer registration.

WO 2015/188307 discloses compositions for fused filament fabrication comprising at least one thermoplastic material, maleic anhydride, at least one fatty acid salt, and at least one radical initiator. The thermoplastics may comprise ethylene-methacrylic acid copolymers and polyamides.

U.S. Pat. No. 8,586,663 discloses blends of polyamides and ethylene (meth)acrylic acid ionomers in which the ionomer is the continuous phase.

There is still a need, therefore, for improved compositions of filaments comprising semi-crystalline thermoplastics for FFF, and methods for processing these filaments via FFF, which overcome warpage and shrinkage issues to produce articles having desirable shrinkage, warpage, and printing properties.

BRIEF DESCRIPTION OF THE DRAWING

FIG. 1 shows three perspective views of the test bars used in the Examples of the invention.

DETAILED DESCRIPTION OF THE INVENTION

Abbreviations

The claims and description herein are to be interpreted using the abbreviations and definitions set forth below.
"MI" refers to Melt Index.
"%" refers to the term percent.
"wt. %" refers to weight percent.
"MPa" refers to megapascal

Definitions

As used herein, the article "a" refers to one as well as more than one and does not necessarily limit its referent noun to the grammatical category of singular number.

As used herein, the terms "about" and "at or about", when used to modify an amount or value, refers to an approximation of an amount or value that is more or less than the precise amount or value recited in the claims or described herein. The precise value of the approximation is determined by what one of skill in the art would recognize as an appropriate approximation to the precise value. As used herein, the term conveys that similar values, not precisely recited in the claims or described herein, can bring about results or effects that are equivalent to those recited in the claims or described herein, for which one of skill in the art would acknowledge as acceptably brought about by the similar values.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. When an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the terms "filament", "fiber", and "strand" may be used interchangeably and refer to slender threadlike objects in which the cross-section may be circular, oval, or flat in shape.

As used herein, the term "dispersion" refers to a system in which thermoplastic polymer particles are dispersed in a continuous thermoplastic polymer phase having a different composition than the thermoplastic particles.

As used herein, the term "melting peak temperature" refers to the peak temperature of an endothermic curve when a thermoplastic polymer is heated using a differential scanning calorimeter (DSC).

As used herein, terms that describe molecules or polymers follow the terminology in the IUPAC Compendium of Chemical Terminology version 2.15 (International Union of Pure and Applied Chemistry) of Sep. 7, 2009.

Referring to FIG. 1, properties of 3D-printed parts are frequently dependent upon the direction of measurement. Parts, such as tensile bars, printed in the xy plane are referred to herein as being printed "flat" or as printed in the "xy direction" or the "y direction". Correspondingly, parts, such as tensile bars, printed in the zx plane are referred to herein as being printed "vertical" or as printed in the "zx direction" or the "z direction". Correspondingly, parts, such as tensile bars, printed in the xz plane are referred to herein as being printed "on-edge" or as printed in the "xz direction", also referred to as the "x direction". Characteristics of a material or of a 3D part printed from a material in the xy and xz directions refer to the characteristics as measured perpendicular to the direction of layer by layer deposition. In contrast, characteristics of a material or of a 3D part printed from a material in the zx or z direction refer to the characteristics as measured parallel to the direction of layer by layer deposition.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Polymer compositions, compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, polymer compositions, compounds, mixtures, and articles described herein specifically intends to include any possible combination of materials, methods, steps, values, ranges, etc.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Disclosed herein are filaments for use in the fused filament fabrication of articles, said filament comprising a polymer composition, said polymer composition comprising:
a) about 5 wt. % to about 60 wt. % of a thermoplastic polymer A having a melting peak temperature greater than 40° C.;
b) about 95 wt. % to about 40 wt. % of a thermoplastic polymer B having a melting peak temperature greater than 20° C.;
c) optionally from about 0.1 to 3 wt. % of a viscosity modifier;
wherein:
the melting peak temperature of thermoplastic polymer A is at least 20° C. greater than the melting peak temperature of thermoplastic polymer B;

thermoplastic polymer A is dispersed in thermoplastic polymer B;
the polymer composition has a melt index of at least 0.1 g/10 minutes using a 10 kg weight measured according to ASTM D1238-13 and at a temperature which is less than the melting peak temperature of thermoplastic polymer A and which is greater than the melting peak temperature of thermoplastic polymer B.

Also disclosed herein are articles prepared from filaments disclosed herein using fused filament fabrication processes. Such articles exhibit improved warpage compared to articles comprising a single thermoplastic polymer. Further disclosed herein are processes for producing a filament for fused filament fabrication.

Specifically, disclosed herein are filaments for use in fused filament fabrication processes, said filaments comprising a polymer composition, said polymer composition comprising a mixture of thermoplastic polymer A and thermoplastic polymer B in which thermoplastic polymer A has a melting point which is at least 20° C., preferably at least 40° C., and more preferably at least 60° C. greater than the melting point of thermoplastic polymer B.

The polymer compositions described herein for use in preparing filaments for fused filament processes comprise a dispersion of a continuous phase and a dispersed phase within the continuous phase. It is essential that thermoplastic polymer B is the continuous phase of the polymer composition and thermoplastic polymer A is the dispersed phase within the polymer composition. The polymer compositions described herein for use in preparing filaments exhibit a melt index, as measured by ASTM D1238-13, of at least 0.1 g/10 minutes using a 10 kg weight, measured at a temperature greater than the melting peak temperature of thermoplastic polymer B and less than the melting peak temperature of thermoplastic polymer A. Preferably, the polymer composition exhibits a melt index of at least 0.1 g/10 minutes at a temperature which is at least 10° C. less than the melting peak temperature of thermoplastic A and at least 10° C. greater than the melting peak temperature of thermoplastic B, more preferably the polymer composition exhibits a melt index of at least 0.1 g/10 minutes at a temperature which is at least 20° C. less than the melting peak temperature of thermoplastic A and at least 20° C. greater than the melting peak temperature of thermoplastic B, and most preferably the polymer composition exhibits a melt index of at least 0.1 g/10 minutes at a temperature which is at least 40° C. less than the melting peak temperature of thermoplastic A and at least 40° C. greater than the melting peak temperature of thermoplastic B.

It is important that the melt index of polymer compositions disclosed herein is measured at a temperature which is less than the melting point of thermoplastic polymer A and greater than thermoplastic polymer B. The filaments comprising the polymer compositions disclosed herein, when used for 3D printing of articles, are heated to a temperature which is less than thermoplastic polymer A and greater than thermoplastic polymer B such that thermoplastic polymer A is not in the melt state.

A major advantage of filaments comprising the polymer compositions disclosed herein is that the use of such filaments in 3D printing processes allows for the manufacture of articles from thermoplastic polymers having melting points which are too high to be printed without causing degradation of the polymer or deformation of the articles. Such polymers are defined herein as thermoplastic polymer A.

A dispersion of thermoplastic polymer A particles in thermoplastic polymer B, which is in the melt state, yields a flowable molten polymer composition which can be used in 3D printing processes to produce articles comprising a high melting thermoplastic polymer A without having to process the filament at temperatures above the melting point of thermoplastic polymer A. In other words, the polymer compositions disclosed herein allow for the manufacture of 3D printed articles by FFF which comprise thermoplastic polymer A at temperatures well below the melting point of thermoplastic polymer A. 3D printed articles prepared from the novel filaments disclosed herein achieve property improvements attributable to the characteristics of thermoplastic polymer A while retaining the desirable processing characteristics of thermoplastic B.

Thus, it is important that during manufacture of 3D printed articles from the polymer compositions disclosed herein, that the processing temperatures are not above the melting point of thermoplastic polymer A. The processing temperatures must be above the melting point of thermoplastic polymer B and the resulting polymer melt have a melt index of at least about 0.1 g/10 minutes using a 10 kg weight measured according to ASTM D1238-13 method A. If the melt index is below about 0.1 g/10 minutes the viscosity becomes too high to allow for easy printing of 3D articles Articles prepared from filaments comprising the compositions disclosed herein using fused filament fabrication processes exhibit lower shrinkage upon cooling and less distortion compared to articles prepared using compositions which comprise either thermoplastic polymer A or B or compositions in which thermoplastic polymer B is dispersed in thermoplastic polymer A.

Thermoplastic Polymer A

Thermoplastic polymer A used in the polymer compositions described herein to prepare filaments can be any thermoplastic polymer having a melting peak temperature of at least 40° C. and wherein the melting point of thermoplastic polymer A is at least 20° C. greater than the melting peak temperature of thermoplastic polymer B. Examples of suitable thermoplastic polymers A include ethylene homo- and co-polymers, syndiotactic or isotactic propylene homo- and co-polymers, polyamides, polyamide co-polyethers, polyamide copolyesters, polyesters, polyester co-polyethers, polyester co-polyesters, polyacetals, polyimides, fluoropolymers, polyurethanes, polyphenylene sulfide, syndiotactic polystyrene, chlorinated polyethylene, and polyvinyl chloride.

Thermoplastic polymer A has a melting peak temperature which is at least 20° C. greater, preferably at least 40° C. greater, and more preferably at least 60° C. greater than the melting peak temperature of thermoplastic polymer B.

Thermoplastic polymer A comprises about 5 wt. % to 60 wt. %, preferably 10 wt. % to 60 wt. %, and most preferably 20 wt. % to 60 wt. % of the polymer composition based on the total weight of thermoplastic polymer A and thermoplastic polymer B in the polymer composition.

Thermoplastic Polymer B

Thermoplastic polymer B used in the polymer compositions described herein to prepare filaments can be any thermoplastic polymer having a melting peak temperature of at least 20° C. and wherein the melting peak temperature of thermoplastic polymer A is at least 20° C. greater than the melting peak temperature of thermoplastic polymer B. Examples of suitable thermoplastic polymers B include ethylene homo- and co-polymers, syndiotactic or isotactic propylene homo- and co-polymers, polyamides, polyamide co-polyethers, polyamide copolyesters, polyesters, polyester co-polyethers, polyester co-polyesters, polyacetals, polyimides, fluoropolymers, polyurethanes, polyphenylene sulfide, syndiotactic polystyrene, chlorinated polyethylene, and polyvinyl chloride.

Thermoplastic polymer B comprises 95 wt. % to 40 wt. %, preferably 90 wt. % to 40 wt. %, and most preferably 80 wt. % to 40 wt. % of the polymer composition based on the total weight of thermoplastic polymer A and thermoplastic polymer B in the polymer composition.

Polymer Composition

Thermoplastic polymer A and thermoplastic polymer B are different polymers in the polymer compositions described herein and the morphology of the polymer compositions prepared from thermoplastic polymer A and thermoplastic polymer B is such that thermoplastic polymer B is the continuous phase and thermoplastic polymer A forms the dispersed phase within the continuous phase of the polymer composition. In other words, the compositions described herein cannot comprise a single phase.

Achieving a blend morphology in which thermoplastic polymer A comprises the dispersed phase within a continuous phase of thermoplastic polymer B can be accomplished by techniques known to those skilled in the art. These techniques include altering the viscosities and/or weight fractions of the thermoplastics comprising the blend, varying the mixing conditions, including one or more compatibilizers for the thermoplastics in the blend, or including an ingredient that changes the viscosity of one or both of the thermoplastics in situ, i.e., during the blending process. Viscosity modifiers used in situ may function to either increase or decrease the viscosity of one or both thermoplastics, to promote the desired dispersed phase morphology.

Examples of polymer compositions comprising thermoplastic polymer A and thermoplastic polymer B, respectively, include:

Polyamides and zinc neutralized ethylene-(meth)acrylic acid co-polymers

Polybutylene or polyethylene terephthalate and polyester-ether copolymers

Polyamide and polyamide-ether or polyamide-ester copolymers

Polypropylene homo- or co-polymers and polyethylene homo- or co-polymers

Fluoropolymers comprising vinylidene fluoride and polyesters.

Polyesters and ethylene copolymers comprising vinyl acetate, methyl acrylate, ethyl acrylate, or butyl acrylate.

The polymer compositions disclosed herein have a melt index of at least 0.1 g/10 minutes (10 kg weight). Although there is no absolute upper limit for the melt index, a practical upper limit is 1000 g/10 minutes using a 2 kg weight measured according to ASTM D1238-13 at a temperature which is less than the melting peak temperature of thermoplastic polymer A and which is greater than the melting peak temperature of thermoplastic polymer B.

Viscosity Modifier

Depending on the weight percent of thermoplastic polymer A dispersed in thermoplastic polymer B, the polymer compositions may additionally comprise a viscosity modifier. Examples of viscosity modifiers include styrene maleic anhydride copolymers, ethylene maleic anhydride co-polymers, peroxides, polyisocyanates, polyepoxides, and polyoxazolines. Other anhydride graft polymers and co-polymers may also be used as viscosity modifiers. Such anhydride graft co-polymers typically comprise from about 20 mole percent to 60 mole percent anhydride monomers.

When present, the viscosity modifier may be added to the polymer composition in a concentration of from about 0.1 to 3 weight percent, preferably from 0.5 to 2 weight percent of the total weight of the polymer composition. It is understood that when a viscosity modifier is used that the sum of the concentration of thermoplastic polymer A, thermoplastic polymer B, and viscosity modifier add up to 100 weight percent when no other materials are present.

Viscosity modifiers become most useful when thermoplastic polymer A is present in the polymer composition at concentrations greater than about 35 weight percent and are generally not needed when thermoplastic polymer A is present at concentrations less the about 35 weight percent.

Process for Preparing Polymer Compositions

The polymer composition may be produced by feeding thermoplastic polymer A and thermoplastic polymer B, and optionally viscosity modifiers or other additives, into a device designed to mix molten thermoplastic polymers such as a single or twin screw extruder, Banbury® mixer, Farrel Continuous Mixer (FCM™), or a two-roll mill. The thermoplastic polymers are fed into the mixing device where they are melted, mixed, cooled, and if desired, pelletizing or granulating the cooled polymer composition to produce a polymer composition for use in making filaments.

Process for Producing Filaments

The filament, strand, or fiber for use in a fused fabrication process may be formed by any method known in the art. For example, filaments disclosed herein may be prepared by the following process steps:
1) Pellets of the polymer composition are fed into an extruder in which the temperature in the extruder is greater than the melting peak temperature of thermoplastic polymer B and less than the melting peak temperature of thermoplastic polymer A;
2) extruding the melt mixture through a die and cooling the mixture to form a filament.

Alternatively, filaments disclosed herein may be prepared by the following process steps:
1) mixing thermoplastic polymer A and thermoplastic polymer B, and optionally viscosity modifiers or additional additives, at a temperature greater than the melting peak temperature of thermoplastic polymer A to form a melt mixture;
2) extruding the melt mixture through a die and cooling the mixture to form a filament.

Process for Producing Articles

The polymer compositions described herein may be used to prepare filaments, fibers, and strands for producing articles by fused fabrication processes. These thermoplastic compositions allow articles to be prepared using 3-dimensional printing techniques wherein the articles comprise high melting thermoplastic polymers. Such articles exhibit desirable properties compared to articles produced by single phase compositions.

Articles produced from filaments comprising polymer compositions disclosed herein may be prepared by fused filament fabrication wherein the temperature of the die is less than the melting peak temperature of thermoplastic polymer A.

Fused filament fabrication is a process commonly used to prepare articles from filaments. Generally, in fused filament fabrication, a filament, comprising the polymer composition disclosed herein, is fed through a heated die wherein the temperature of the die is sufficiently high to melt the filament to a melt index of at least 0.1 g/10 min. using a 10 kg weight. The molten filament exits the die and is deposited in a layer-by-layer fashion to form the desired article. Control of deposition rate may be varied by altering the filament feed rate, filament cross sectional dimensions, and the rate of motion of the die head and/or article.

More specifically, articles disclosed herein may be prepared by the following process steps:
1) feeding a filament comprising the polymer composition through a heated die at a temperature less than the melting peak temperature of thermoplastic polymer A but greater than the peak melting temperature of thermoplastic polymer B to form a polymer melt;
2) depositing the polymer melt in a layer-by-layer fashion to form the desired article.

FIG. 1 shows the various directions in which the test bars can be tested.

EXAMPLES

The exemplary compounds identified by "E" in the tables below are intended only to further illuminate and not to limit the scope of compounds, processes, and articles described and recited herein. Comparative examples are identified in the tables below by "C".

| | Materials |
|---|---|
| B1 | A zinc neutralized ionomer having a melting peak temperature of 89° C., and a MFR of 4.5 g/10 min under 2.16 kg load at 190° C. |
| B2 | A zinc neutralized ionomer having a melting peak temperature of 89° C., and a MFR of 0.7 g/10 min under 2.16 kg load at 190° C. |
| B3 | Thermoplastic polymer B is a polyester-ether copolymer having a peak melting point of 170° C., and a MFR of 5 g/10 min under 2.16 kg load at 190° C. |
| A1 | Polyamide 6/6 having a melting peak temperature of 262° C., and a relative viscosity of 47-51. |
| A2 | Polyamide copolymer comprising copolymerized units of hexamethylene diamine, adipic acid, and terephthalic acid having a melting peak temperature of 260° C., and a relative viscosity of 37-45. |
| A3 | Polybutylene terephthalate and polyethylene terephthalate copolymer having a peak melting point of 225° C., and a MFR of 16 g/10 min under 2.16 kg load at 250° C. |
| A4 | Polybutylene terephthalate and polyethylene terephthalate copolymer having a peak melting point of 225° C., and a MFR of 10 g/10 min under 2.16 kg load at 250° C. |
| VM | SMA-1000, styrene-maleic anhydride co-polymer viscosity modifier for polyamide, available from Cray Valley Corp. |

Test Methods

Peak melting temperature was measured according to ASTM D3418-15.

Melt Index or Melt Flow Rate (MFR) was measured according to ASTM D1238-13 procedure A, using a 10 Kg weight and temperature as specified. Results are reported in units of grams/10 minutes.

Flexural Modulus (FM) was measured according to ISO 178:2010, method A.

Procedure for Making Filaments

Examples E1 to E4 were prepared by adding thermoplastic polymer A, thermoplastic polymer B, and for examples E2 to E4, a viscosity modifier, into a Prism® 18 mm twin screw extruder operating at 300 rpm and at a barrel temperature of 280° C. The polymer composition was extruded through a die into a water bath at a temperature between 5-60° C., followed by a pelletizer to produce polymer blends. The above-mentioned pellets of the polymer blends comprising thermoplastic polymer A and thermoplastic polymer B were feed into a Werner & Pfleiderer 28 mm twin screw extruder equipped with a Zenith PEP-II melt pump. The barrel temperatures were set at 200-250° C. The filament was moved by a strand puller at a rate to prevent breakage and wound into spools. Two diameters of filaments, 2.85 mm and 1.75 mm, were produced by adjusting the pulling rate.

Examples E5, E6, C1, and C2 were prepared by adding thermoplastic polymer A, thermoplastic polymer B, and for E5 and E6, a viscosity modifier, into a Berstorff® 23 mm twin screw extruder operating at 300 rpm and a barrel temperature of 280° C. The polymer composition was extruded through a die into a water bath at a temperature between 5-60° C. followed by a pelletizer to produce polymer blends. The above-mentioned pellets of the polymer blends comprising thermoplastic polymer A and thermoplastic polymer B were feed into a Werner & Pfleiderer 28 mm twin screw extruder, optionally equipped with a Zenith PEP-II melt pump. The barrel temperatures were set at 200-250° C. The filament was moved by a strand puller at a rate to prevent breakage and wound into spools. Two diameters of filaments, 2.85 mm and 1.75 mm, were produced by adjusting the pulling rate.

Examples E7 to E9 were prepared by adding thermoplastic polymer A, thermoplastic polymer B, into a Werner & Pfleiderer 28 mm twin screw extruder operating at 300 rpm and at a barrel temperature of 240° C. The polymer composition was extruded through a die into a water bath at a temperature between 5-60° C., followed by a pelletizer to produce polymer blends. The above-mentioned pellets of the polymer blends comprising thermoplastic polymer A and thermoplastic polymer B were feed into a 1¼ inch Brabender single screw extruder, optionally equipped with a Zenith PEP-II melt pump. The barrel temperatures were set at 180-210° C. The polymer composition was extruded through a die into a water bath at a temperature between 5-60° C. to produce filaments. The filament was moved by a strand puller at a rate to prevent breakage and wound into spools. Two diameters of filaments, 2.85 mm and 1.75 mm, were produced by adjusting the pulling rate.

TABLE 1

|  | E1 | E2 | E3 | E4 | E5 | E6 | C1 | C2 | C3 | C4 |
|---|---|---|---|---|---|---|---|---|---|---|
| B1 | 70 | 59.6 | 49.5 | 39.4 |  |  |  |  | 100 |  |
| B2 |  |  |  |  | 60 | 59.6 | 60 | 60 |  | 100 |
| A1 | 30 | 40 | 50 | 60 |  | 40 | 40 |  |  |  |
| A2 |  |  |  |  | 39.6 |  |  | 40 |  |  |
| VM |  | 0.4 | 0.5 | 0.27 | 0.4 | 0.4 |  |  |  |  |
| Physical Properties | | | | | | | | | | |
| MI | 18.4 | 44.2 | 16.7 | 0.27 | 3.3 | 1.2 | NF* | 0.02 |  |  |
| FM (MPa) | 482 | 572 | 739 | 915 | 491 | 778 | 1051 | 878 | 338 | 330 |

*NF—no flow

Table 1 shows that examples E1 to E6 all exhibit a melt index of at least 0.1 g/10 min when measured as 220° C. even though thermoplastic polymers A1 and A2 have melting points of at least 260° C. Examples E1 to E4 exhibit flexural modulus values which are at least 42 percent greater than thermoplastic polymer B1 alone (C3). Examples E5 to E6 exhibit flexural modulus values which are at least 48 percent greater than thermoplastic polymer B2 alone (C4).

When articles were produced from a FFF process using filaments comprising the compositions of Table 1, the articles exhibited excellent surface smoothness, with no visible warpage and a desirable visual appeal.

E2 through E6 demonstrate the advantageous use of a viscosity modifier to promote dispersion of thermoplastic polymer A into the continuous phase of thermoplastic polymer B. C1 is essentially identical to E6 except C1 does not comprise a viscosity modifier. C1 does not exhibit a melt index of at least 0.1 g/10 min. E3 provided excellent FFF performance even when the dispersed phase concentration is 50% by weight. E6 and CE1 differ primarily by the presence of 0.4% by weight of the viscosity modifier. E6 readily flows at 220° C., whereas C1 does not flow at all under the test conditions.

TABLE 2

|  | E7 | E7 | E8 | E8 | E9 | E9 | C5 | C5 | C6 | C6 |
|---|---|---|---|---|---|---|---|---|---|---|
| B3 | 85 | 85 | 75 | 75 | 75 | 75 |  |  |  |  |
| A3 | 15 | 15 | 25 | 25 |  |  | 100 | 100 |  |  |
| A4 |  |  |  |  | 25 | 25 |  |  | 100 | 100 |
| MI | High** | 49.4 | 57.9 | 17.9 | 60.3 | 21.4 | NF* | NF* | NF* | NF* |
| MI (temp) | 220 | 200 | 220 | 200 | 220 | 200 | 220 | 200 | 220 | 200 |

*NF—no flow;
High** - the flow is too fast to measure.

The results in table 2 show the advantage of preparing filaments for 3D printing from examples E7 to E9, which have desirable MI, compared to C5 and C6 which do not readily flow at the test temperatures.

Fused Filament Fabrication

Tensile Stress at Break and Tensile Strain at Break were measured according to ISO 527-2:2012 using Type 5A or Type 1BA bars, as specified in the Examples. "Flat" Type 5A and Type 1BA bars were printed directly on the printer bed. "Vertical" Type 5A bars were pressed using the appropriate die from a rectangle. The size of the rectangle was 80 mm length×2 mm width×85 mm height. It was printed in the vertical direction with two supporting side walls (20 mm length×2 mm width×85 mm height) and a 20-line brim. Alternatively, "Vertical" Type 5A bars were printing using a .stl file with four Type 5A bars connected by thin strands to a central pillar for support and printed with a 20-line brim. The bars were easily separated from the central pillar with scissors. "Vertical" Type 1BA bars were pressed using the appropriate die from a rectangle. In the case of Type 1BA bars, the size of the rectangle was 80 mm length×2 mm width×90 mm height. It was printed in the vertical direction with two supporting side walls (20 mm length×2 mm width×90 mm height) and with a 20-line brim. "On-Edge" Type 1BA bars were printed with support material utilizing the same material as used in the tensile bar itself. The support material was easily removed with scissors. All bars were printed with 1 shell and 45/−45 degree 100% infill.

Process for Making Filaments of Surlyn® Ionomers for Comparative Examples: Filaments comprising ionomer (A) were produced by feeding ionomer pellets to a 28 mm twin screw extruder equipped with a Zenith PEP-II melt pump. The barrel temperatures and melt pump temperature were set between 170-240° C. depending on the individual ionomers used. As the hot melt came out of the die, it was quenched into a water bath with quenching temperatures between 5-60° C. The quenched filament was moved by a strand puller with controlled rate and wound onto spools. Two diameters of filaments, nominally 2.85 mm and 1.75 mm, were produced by adjusting the pulling rate.

The following printers were used, as specified, for the examples described herein: (a) Lulzbot® Mini (Aleph Objects, Inc. (Loveland, Colo.) equipped with a standard direct-drive extruder and 0.5 mm nozzle and utilizing nominally 2.85 mm filament. (b) Lulzbot® Mini (Aleph Objects, Inc. (Loveland, Colo.) equipped with a flexystruder direct-drive extruder and 0.6 mm nozzle and utilizing nominally 2.85 mm filament. (c) Lulzbot® TAZ6 (Aleph Objects, Inc. (Loveland, Colo.) equipped with a flexystruder direct-drive extruder and 0.6 mm nozzle and utilizing nominally 2.85 mm filament. (d) 3ntr A4v3 (3ntr, Oleggio, Italy; also available from Plural AM of Portland, Oreg.) equipped with two indirect drive and one direct drive extruder, all with 0.4 mm nozzles and utilizing nominally 2.85 mm filament. (e) Makergear M2 (Makergear, LLC; Beachwood, Ohio) equipped with a direct-drive extruder and 0.35 mm nozzle and utilizing nominally 1.75 mm filament.

Tensile properties are reported in Table 2 for flat and vertical type 5A test bars C3 and E1 and for flat, on-edge and vertical type 1BA test bars for E7.

Bars for C3 were printed using the Lulzbot® Mini equipped with a flexystruder and 0.6 mm nozzle. The bars were printed at 30 mm/sec with a 0.25 mm layer height using unconditioned filament (e.g., exposed to ambient conditions for >1 week). The nozzle temperature was 200° C. and the bed temperature was 60° C. for printing the flat and vertical bars. Vertical bars were printed with four Type 5A bars connected by thin strands to a central pillar for support.

Bars for E1 were printed with the Lulzbot® Mini equipped with a standard direct-drive extruder and 0.5 mm nozzle. The bars were printed at 30 mm/sec with a 0.25 mm layer height using unconditioned filament (e.g., exposed to ambient conditions for >1 week). The nozzle temperature was 210° C. and the bed temperature was 85° C. for printing the flat bars. The nozzle temperature was 225° C. and the bed temperature was 85° C. for printing the vertical bars. Vertical bars were printed with four Type 5A bars connected by thin strands to a central pillar for support.

Bars for E3 were printed with the 3ntr A4v3 using the direct-drive extruder and a 0.4 mm nozzle. The bars were printed at 10 mm/sec with conditioned filament (e.g., dried at 80° C. under a vacuum of 20-25 mm/Hg for a minimum of 24 hours). The nozzle temperature was 205° C., the bed temperature was 40° C. and 110% flow was used.

Table 3 shows that filaments as disclosed herein can be printed using common desktop 3D printers and using standard nozzle sizes. A higher modulus, both flat and vertical, is observed for E1 as compared to C3, illustrating the ability of the dispersed nylon in a matrix of ethylene copolymer to increase the modulus of the 3D-printed article. This was further verified by printing flat and vertical Type 5A bars of C3 on different printers at nozzle temperatures ranging from 195° C.-225° C. For example, on the 3ntr A4v3 at nozzle temperatures of 210° C. and 225° C. and with a bed temperature of 85° C., the flat modulus was measured as 288 MPa and 289 MPa, respectively. 340 MPa was the maximum flat modulus measured for C3, which is lower than the flat modulus of 494 MPa measured for E1. When vertical bars were printed with the Makergear M2, a vertical modulus of 335 MPa was measured for C3 at 225° C., which was the maximum vertical modulus measured for C3 and is a lower value than the vertical modulus of 476 MPa measured for E1.

TABLE 3

| | Tensile Stress at Break (MPa) | | | Nominal Strain at Break (%) | | | Modulus (MPa) | | |
|---|---|---|---|---|---|---|---|---|---|
| | Flat | Edge | Vertical | Flat | Edge | Vertical | Flat | Edge | Vertical |
| C3 | 20 | NM | 9 | 140 | NM | 4 | 340[a] | NM | 263[b] |
| E1 | 21 | NM | 13 | 74 | NM | 2 | 494[a] | NM | 576[b] |
| E7 | 13 | 14 | 9 | 807 | 726 | 329 | 17 | 32 | 31 |

[a]Maximum flat modulus measured for C3 was 340 MPa from 195° C.-225° C.
[b]Maximum vertical modulus measured for C3 was 335 MPa from 195° C.-225° C.
NM: Not Measured

The invention claimed is:

1. A filament for use in fused filament fabrication, said filament comprising a polymer composition, said polymer composition comprising:
   a) about 5 wt. % to about 60 wt. % of a thermoplastic polymer A having a melting peak temperature greater than 40° C.;
   b) about 95 wt. % to about 40 wt. % of a thermoplastic polymer B having a melting peak temperature greater than 20° C.;
   c) optionally from about 0.1 to 3 wt. % of a viscosity modifier;
   wherein:
   thermoplastic polymer A is a polyamide and thermoplastic polymer B is selected from the group consisting of polyamide-ethers and polyamide-ester copolymers;
   the melting peak temperature of thermoplastic polymer A is at least 20° C. greater than the melting peak temperature of thermoplastic polymer B;
   thermoplastic polymer A is dispersed in thermoplastic polymer B; and
   the polymer composition has a melt index of at least 0.1 g/10 minutes using a 10 kg weight measured according to ASTM D1238-13 at a temperature which is less than the melting peak temperature of thermoplastic polymer A and which is greater than the melting peak temperature of thermoplastic polymer B.

2. An article prepared from the filament of claim 1 using a fused filament fabrication process.

3. The filament of claim 1 in which viscosity modifier (c) is present.

4. The filament of claim 1 wherein the polymer composition exhibits a melt index of at least 0.1 g/10 minutes at a temperature which is at least 10° C. less than the melting peak temperature of thermoplastic A and at least 10° C. greater than the melting peak temperature of thermoplastic B.

5. A process for making the filament of claim 1 comprising:
   1) mixing thermoplastic polymer A and thermoplastic polymer B, and optionally viscosity modifiers or additional additives, at a temperature greater than the melting peak temperature of thermoplastic polymer A to form a melt mixture;
   2) extruding the melt mixture through a die and cooling the mixture to form a filament.

6. A process for making the filament of claim 1 comprising:
   1) pellets of the polymer composition are fed into an extruder in which the temperature in the extruder is greater than the melting peak temperature of thermoplastic polymer B;
   2) extruding the melt mixture through a die and cooling the mixture to form a filament.

7. A process for making an article by fused filament fabrication comprising:
   1) feeding a filament comprising the polymer composition of claim 1 through a heated die at a temperature less than the melting peak temperature of thermoplastic polymer A but greater than the peak melting temperature of thermoplastic polymer B to form a polymer melt;
   2) depositing the polymer melt in a layer-by-layer fashion to form the desired article.

* * * * *